US006832583B2

(12) United States Patent
Hayman

(10) Patent No.: US 6,832,583 B2
(45) Date of Patent: Dec. 21, 2004

(54) DIRECT ACTING DIFFERENTIAL TWO-STEP VALVE TRAIN

(75) Inventor: Alan W. Hayman, Romeo, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/439,484

(22) Filed: May 16, 2003

(65) Prior Publication Data

US 2004/0226524 A1 Nov. 18, 2004

(51) Int. Cl.$^7$ ................................................. F01L 1/34
(52) U.S. Cl. ............................... 123/90.16; 123/90.15; 74/567
(58) Field of Search ............... 123/90.12, 90.15–90.18, 123/90.31, 90.27, 90.48–90.59; 74/53–55, 567, 569, 25

(56) References Cited

U.S. PATENT DOCUMENTS 5,813,377 A * 9/1998 Matsunaga ............... 123/90.17
6,390,041 B2 * 5/2002 Nakamura et al. ....... 123/90.15

FOREIGN PATENT DOCUMENTS

JP         2000064865 A  *  2/2000  ........... F02D/13/02

* cited by examiner

Primary Examiner—Thomas Denion
Assistant Examiner—Jaime Corrigan

(57) ABSTRACT

A direct acting two-step valve train uses direct acting switching valve lifters combined with high and low lift or no lift cams providing differential valve lifts for dual intake valves of cylinders actuated by the low lift cams. The combination provides various alternative operating modes utilizing the charge enhancing qualities of differential intake valve lifts in low lift operation. These modes include (1) high lift to differential low valve lift and (2) high lift to low lift on one bank and high lift or no lift (deactivated) on the other. A cam phaser may also be included to vary cam phasing on single or dual camshafts.

12 Claims, 1 Drawing Sheet

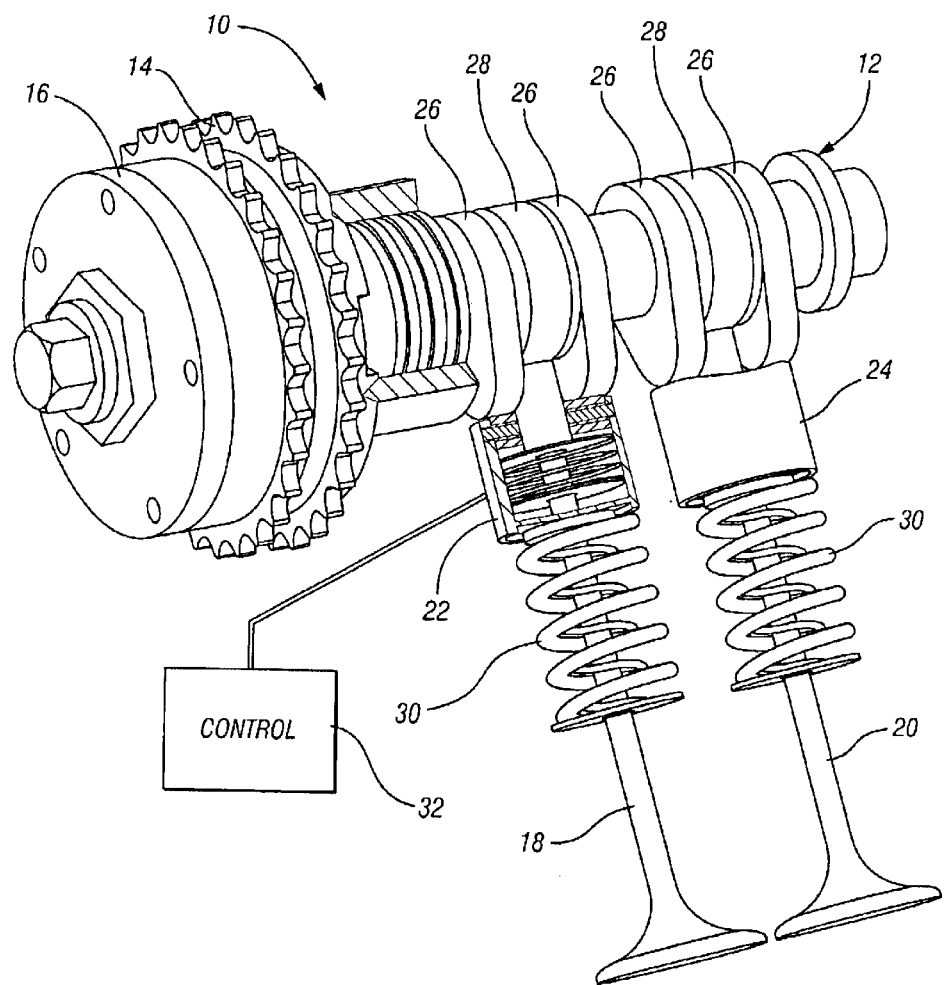

DIRECT ACTING DIFFERENTIAL TWO-STEP VALVE TRAIN

TECHNICAL FIELD

This invention relates to engine valve trains and, more particularly, to a two-step valve train using direct acting switching valve lifters with dual intake valves and cams combined for varying modes of operation.

BACKGROUND OF THE INVENTION

The current state of engine valve trains or valve actuating mechanisms abounds with devices for changing the timing and/or lift of engine valves, particularly intake valves, during operation of the engine in order to improve engine fuel efficiency, reduce exhaust emissions and increase performance.

Among the recently reported arrangements is one in which overhead camshafts actuate rocker arms that operate the intake and exhaust valves of the engine. The camshafts include multiple cams that operate through alternate rocker arm actuators to selectively provide high lift or low lift levels of intake and exhaust valve operation. A camshaft phase changer may be included which varies the phase of the intake valves to desirably alter the valve timing for different operating modes.

Another system utilizes direct acting switching valve lifters driven by an overhead camshaft. The camshafts have high lift and reduced lift cams to allow changing of the valve lift from a high lift mode to a low lift mode. The low lift cams for the two intake valves are identical so that all the valves operate with identical high lift profiles which are selectively replaceable by operation on identical low lift profiles. Again, a camshaft phase adjuster may be provided to alter the relative camshaft positions for varying the phase of the intake and exhaust camshafts.

In a third known arrangement, so-called switching lifters have been proposed for deactivating, or cutting out, operation of some of the cylinders of an engine by switching the valves to a no lift mode. Then engine operation is continued entirely by the remaining operational cylinders. Currently-available forms of switching or displacement on demand valve lifters may be utilized for this type of operation.

SUMMARY OF THE INVENTION

The present invention provides an improved valve train which utilizes variations of current technology together with innovative combinations thereof to provide various operational alternatives not found in the known prior art.

In one form of the invention, modifications of known direct acting valve lifters are utilized to provide high lift or low lift intake valve actuation as well as comparable exhaust valve actuation, utilizing the modified two-step valve lifters for direct actuation of the valves, as compared to indirect actuation through rocker arms or other mechanisms. Single or dual cam phasers may be added to the combination if desired for varying valve timing events.

The arrangement provides a compact valve train avoiding the extra mechanisms involved with additional intermediate components, such as rocker arms or push rods in a valve train system. Additionally, the low lift cams for the dual intake valves for each cylinder are ground to provide variations in the valve lift, and also timing if desired, in order to provide improved swirl and mixing of the cylinder charge during low speed operation of the engine.

In an alternative embodiment, a group of, preferably half of, the engine cylinders may be arranged for reduced valve lift operation at a zero lift FIGURE. This shuts off both intake and exhaust valves on these cylinders while continuing to operate the engine on the remaining cylinders for more efficient low speed and load engine operation.

The operating cylinders may be programmed to be operated either in the high lift or low lift modes of operation, depending on the engine requirements for operation of the associated vehicle, in order to provide the most efficient operating conditions. When fast acceleration or high speed operation are required, both groups of cylinders are switched back to high lift operation to provide for full engine output if required. When operated in the low lift mode, the intake valves are again operated with differing lifts so that a primary intake valve is open a greater amount to provide advantageous cylinder swirl and charge mixing conditions and the secondary valve is opened sufficiently to add slightly to the cylinder charge while maintaining the ports in operating condition for immediate return to high lift operating mode as required.

With any of these alternatives, one or two can phasing devices may be mounted on the single or dual camshafts to provide variations in cam timing as may be desirable for the various operating modes.

These and other features and advantages of the invention will be more fully understood from the following description of certain specific embodiments of the invention taken together with the accompanying drawings.

BRIEF DESCRIPTION OF THE DRAWINGS

The single drawing FIGURE is a pictorial view of a portion of a direct acting valve train according to the invention having parts broken away to show certain interior features of the components.

DESCRIPTION OF THE PREFERRED EMBODIMENT

Referring to the drawing in detail, numeral 10 indicates an engine valve train for use in an overhead cam piston-type engine. The valve train includes a camshaft 12 which is driven through a drive sprocket 14 connected by a chain, not shown, with the engine crankshaft. A cam phaser 16 is provided adjacent the drive sprocket 14 and connected between the sprocket and the camshaft 12 in order to vary the timing of the camshaft relative to the piston motion and other operating functions of the engine and relative to other camshafts of the engine if provided.

As shown, the camshaft 12 actuates first and second intake valves 18, 20, respectively, of the same engine cylinder. The valves are actuated through separate switching valve lifters 22, 24 which are engaged by dual sets of cam lobes including dual high lift cams 26 and single reduced lift cams 28 for each intake valve. Valve springs 30 are provided to maintain the valves in their closed positions except when they are actuated to an open position by action of the cams and lifters.

A complete valve train for the engine, of course, requires additional cams and lifters for actuating valves of the other engine cylinders, not shown, and in a V-type engine could additionally require a second overhead camshaft 12 for actuating the intake valves in the second cylinder bank, not shown. Also, a mechanism identical to that illustrated as valve train 10 would also be provided in one embodiment of the invention in order to actuate the engine exhaust valves, which could be represented by valves 18, 20 of the valve train 10. While the engine as contemplated would preferably include dual exhaust valves as well as dual intake valves for each cylinder, an alternative embodiment could utilize a single exhaust valve for each cylinder, in which case only a single set of high and reduced lift cams and a single valve lifter would be required for actuating the exhaust valve of each cylinder.

In a preferred embodiment of the invention, the intake valves 18, 20 and the associated exhaust valve or valves similar to valves 18, 20 are operated in a high lift mode by the dual high lift cams 26 of the camshaft acting through the valve lifters 22, 24 to provide full opening motion of the valves for high speed and power operation of the engine, as well as for starting in most cases. Thus, both intake valves are operated in a high lift mode and the associated one or two exhaust valves would similarly be actuated in a high lift mode by dual high lift cams.

For operation in highway cruising and ordinary driving conditions on city streets, the valve lifters 22, 24 would be switched such as by an electronic control 32, indicated schematically and acting upon hydraulic oil pressure supply means in known manner. The switched lifters 22, 24 would then disconnect the drive of the high lift cams from the valves and instead actuate the valves by the reduced lift cams 28 so that the intake valves are opened to a lower lift FIGURE.

For example, both intake valves may be opened to a lift of 10 or 11 millimeters in the high lift mode, whereas in the low lift mode the first intake valve could be actuated to a lift in the range of about 2 to 5 millimeters while the second intake valve could be actuated to a lift in the range of from about 0.5 to 2 millimeters. These ranges are suitable for many current automotive engine configurations but could, of course, be varied depending on the size and type of engine which may be involved.

Similarly, the associated exhaust valves for each cylinder of the engine, when actuated in the low lift mode, could be driven by their cams, similar to cams 28, to low lift valve openings in the range of about 3 to 7 millimeters. The use of the cam phaser to vary the timing of the cams under various conditions is an optional additional feature of the valve train.

In a second embodiment of the illustrated valve train, the engine may be divided into two groups of cylinders, including a first group of cylinders which may be deactivated and a second group of cylinders which may be actuated to low lift operation. In the high lift operating mode of all the cylinders, both the intake and exhaust valves will be actuated by their respective high lift cams 26 to open to their predetermined full lift, such as 10 or 11 millimeters, for operation of the engine under high or maximum power conditions.

To operate at a reduced load condition, the reduced lift cams 28 of the deactivation cylinders will be ground to provide no valve lift when the valve lifters 22, 24 are switched to the reduced lift condition. The exhaust valves would be similarly controlled so that when the lifters are switched to the reduced lift condition, the valves both intake and exhaust will remain closed and the cylinders will be deactivated. Conventionally, the fuel delivery to the cylinders is also turned off during this operating mode.

The remaining cylinders not deactivated may be controlled to continue operation in the high lift condition if desired. However, they may also be controlled by actuation of the switching lifters 22, 24 to be driven by the low lift cams 28 which, as previously discussed, are operated to provide differing valve lifts lower than the high lift values.

For example, the first intake valves could be opened to a lift of about 2 to 5 millimeters while the second intake valves of the same cylinders could open to only about 0.5 to 2 millimeters. This provides a substantial reduction in engine power with adequate torque and improved efficiency for operating the engine at cruising speeds and in moderate driving on city streets. The lift of the associated exhaust valves of the low lift cylinders would also be reduced to a suitable range such as about 3 to 7 millimeters as required for the particular engine arrangement.

Again, the cam phaser 16 may be utilized as desired on the intake camshaft or on a separate exhaust camshaft or on both in order to vary phasing of the cams as may be desirable for obtaining the most efficient and useful operating modes of the valve train.

As may be seen from the foregoing, the present invention comprises a valve train that needs only modifications in the shape of the reduced lift cams 28, which may be designed for low valve lift or for no valve lift as desired, to provide several alternative modes of operation for engines utilizing the disclosed features.

All of the embodiments utilize direct acting switching valve lifters which may be actuated to provide either high lift or reduced lift valve operation. Additionally, by proper grinding of the reduced lift cams, the valves may be operated in a predetermined differential intake valve operating mode or in a closed valve no lift mode in order to provide alternative operating conditions for the engine at various performance levels.

Thus, an engine could be switched from a high lift mode for full performance to a split mode wherein one group of cylinders operates at low lift while another operates at high lift for a first level of reduced performance. Further, the low lift cylinders could be returned to high lift operation while the high lift cylinders are switched to no lift operation being yet a further reduction in performance level.

Finally, the high lift cylinders could be reduced to low lift operation while the other cylinders remain deactivated, thus resulting in a lower range of performance and obtaining a highest efficiency. This would provide a low level of performance but a high level of operating efficiency for the engine when operating in relatively low power requirement conditions.

Alternatively, the same combinations of components can, by modification only of the low lift cams 28 to a desired lift level, provide an engine which switches only from a high lift full performance operation on both camshafts to a low lift reduced performance and improved efficiency operation on both camshafts in a low lift mode. Alternatively, the same engine could be operated in an intermediate mode wherein one bank is maintained on high lift operation and the other bank or group of cylinders is moved to low lift operation to provide an intermediate power level.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A valve train for an overhead cam piston engine including first and second intake valves and at least one exhaust valve per cylinder, the cylinders being disposed in at least one cylinder bank, and the valve train comprising:
  at least one overhead camshaft for each cylinder bank including high lift and reduced lift cams for each intake valve;

a direct acting valve lifter for each intake valve, the valve lifters being selectively operable to actuate the intake valves of all cylinders in a high lift mode or to actuate the intake valves of at least some of the cylinders in a reduced lift mode;

wherein, in the reduced lift mode, the intake valves of at least selected cylinders are actuated in a low valve lift mode in which the first intake valves have a low valve lift opening greater than the low valve lift opening of the second intake valves.

2. A valve train as in claim 1 wherein, in the reduced lift mode, all the intake valves are actuated in the low valve lift mode.

3. A valve train as in claim 2 wherein, in the low valve lift mode, the lift of the first intake valves is in the range of about 2–5 mm and the lift of the second intake valves is in the range of about 0.5–2 mm.

4. A valve train as in claim 2 wherein, in the reduced lift mode, all the exhaust valves are also actuated in the low valve lift mode with a valve lift opening smaller than the exhaust valve lift opening in the high lift mode.

5. A valve train as in claim 4 wherein, in the low valve lift mode, the lift of the exhaust valves is in the range of about 3–7 mm.

6. A valve train as in claim 1 wherein, in the reduced lift mode, the intake valves of non-selected cylinders are actuated in one of the high lift mode and a no lift mode.

7. A valve train as in claim 6 wherein, when the intake valves of the non-selected cylinders are in the no lift mode, the intake valves of the selected cylinders are in the low lift mode in which the lift of the first intake valves is in the range of about 3–7 mm and the lift of the second intake valves is in the range of about 0.5–2 mm.

8. A valve train as in claim 6 wherein, in the reduced lift mode, the exhaust valves of the selected cylinders are also actuated in the low valve lift mode with a lift smaller than that in the high lift mode.

9. A valve train as in claim 8 wherein, in the low valve lift mode, the exhaust valve lift is in the range of about 3–7 mm.

10. A valve train for an overhead cam piston engine including first and second intake valves and at least one exhaust valve per cylinder disposed in at least one cylinder bank, the valve train comprising:

at least one overhead camshaft for each cylinder bank including high lift and reduced lift cams for each intake valve;

a direct acting valve lifter for each intake valve, the valve lifters being selectively operable to actuate the intake valves of all cylinders in a high lift mode or to actuate the intake valves of a first group of cylinders in a low lift mode and the intake valves of a second group of cylinders in a no lift or a high lift mode;

the first intake valves actuatable in the low lift mode having a low lift opening greater than the low lift opening of the second intake valves actuatable in the low lift mode.

11. A valve train as in claim 10 wherein the camshaft has high and reduced lift exhaust cams and a direct acting exhaust valve lifter for each exhaust valve of a cylinder of which the intake valves are actuatable in a low lift mode, the valve lifters being selectively operable to actuate their respective valves in a high lift or a reduced lift mode.

12. A valve train as in claim 10 including a control operative to place the valve train in the high lift mode for engine operation in predetermined high load conditions and to place the valve train in a reduced lift mode for engine operation in predetermined low load conditions.

* * * * *